United States Patent Office 3,207,720
Patented Sept. 21, 1965

3,207,720
POLYVINYL CHLORIDE COMPOSITIONS CURED WITH A METAL HALIDE
Moyer M. Safford, Schenectady, N.Y., assignor to General Electric Company, a corporation of New York
No Drawing. Filed June 5, 1963, Ser. No. 285,611
11 Claims. (Cl. 260—30.6)

This invention is concerned with making solid, infusible, insoluble, plasticized vinyl halide resins. More particularly, the invention relates to a process for rendering plasticized vinyl chloride resins insoluble and infusible by heating the latter in the presence of a minor weight proportion of a metal halide selected from the class consisting of bismuth halides, molybdenum halides, tellurium halides, and platinum halides. The invention also embraces vinyl chloride resins capable of being rendered infusible and insoluble by the presence of the aforesaid metal halides as well as the heat-treated products therefrom to yield the cross-linked, that is, the infusible, insoluble, vinyl chloride resins. The reference in the specification and claims to the above class of metal halides is intended to include hydrates of these metal halides.

Plasticized vinyl halide resins, for instance, plasticized polyvinyl chloride resins have been employed extensively as insulation for electrical conductors. The use of such insulated conductors has been limited as far as temperature is concerned to the point where the plasticized vinyl chloride resin begins to flow and thereby loses its ability to continue as insulation for the metallic conductor. Depending on the environmental conditions this temperature at which the vinyl chloride resins cease to be useful as insulation of the order of about 75 to 100° C., depending in great measure on the vinyl chloride resin and on the type and amount of plasticizer used with the vinyl chloride resin. Attempts have been made in the past to render vinyl chloride resins substantially infusible and insoluble, but for the most part, these attempts have not been too successful. In the first place, the temperature at which these allegedly cross-linked vinyl chloride resins can be used has generally not been high enough. In addition, past cross-linking agents have required excessively long periods of time to effect the desired degree of infusibility and insolubility in the vinyl chloride resin. Furthermore, the degree and quality of cross-linking is often adversely affected when certain plasticizers are used with certain classes of cross-linking agents.

Unexpectedly, I have discovered that a certain class of metallic halides can readily convert vinyl chloride resins to the substantially infusible and insoluble state, and that the amount of the cross-linking agent needed for this purpose is relatively small, while the times required to effect this conversion to the insoluble and infusible state are acceptable for commercial utilization. Also, I have discovered that this class of metallic halides is operative for this purpose without regard to the plasticizer used, although some plasticizers have less effect on the activity of the metal halide than others. Finally, I have also discovered that, by using this particular class of metallic halides for curing vinyl chloride resins, one obtains increased tensile strength at elevated temperatures around 150° C., as well as improved physical properties at room temperature (27–30° C.) over that of the uncured resin. Attempts to cure fluorocarbon polymers such as copolymers of vinylidene fluoride and hexafluoropropylene, polytetrafluoroethylene, and a copolymer of tetrafluoroethylene and hexafluoropropylene, with these metal halides gave properties which were inferior to those of the samples from which the metal halide was omitted, indicating for the most part no cure. Also, attempts to use aluminum chloride as a cross-linking (curing) agent were unsuccessful.

The vinyl chloride resins with which this invention is concerned include not only homopolymers of vinyl chloride but also copolymers of vinyl chloride with other copolymerizable materials. Among such compositions are (1) vinyl chloride resins, such as, for example, polyvinylidene chloride, polyvinyl chloride resins (including the different molecular weight forms, e.g., gammapolyvinyl chloride), chlorinated polyethylene (containing from 5 to 60% chlorine), chlorosulfonated polyethylene, chloroprene, etc.; (2) vinyl resins produced by the conjoint polymerization of vinyl chloride and a vinyl ester of a lower saturated aliphatic monocarboxylic acid, e.g., vinyl acetate (such vinyl chloride-vinyl acetate copolymers being available under the trade name of Vinylite resins wherein the vinyl chloride component is present in a preponderant amount), vinyl propionate, vinyl butyrate, vinyl hexoate, vinyl acetobutyrate, vinyl chloroacetate, vinyl chloropropionate, etc., the term "lower saturated aliphatic monocarboxylic acid" preferably embracing acids containing at most six carbon atoms; (3) vinyl resins produced by the conjoint polymerization of a vinyl halide and an acrylic compound, e.g., the copolymers of vinyl chloride with, for example, ethyl methacrylate, methyl methacrylate, benzyl or chlorobenzyl acrylate, methyl chloroacrylate, etc.; (4) copolymers of a vinyl halide, e.g., vinyl chloride, and a vinylidene halide, specifically vinylidene chloride; and (5) many other vinyl resin copolymers, such as the copolymers of three-component systems, for example, vinyl chloride, vinyl acetate and ethyl methacrylate, etc. As will be understood by those skilled in the art, other multicomponent copolymers may be used, the only requirement being that at least one of the components is a vinyl halide. Further methods of preparation of the vinyl halide resins employed herein and additional examples of vinyl halide copolymers which may be rendered infusible and insoluble with the above metal halides may be found in, for example, D'Alelio Patents 2,378,753, issued June 19, 1945, and 2,299,740, issued October 27, 1942, both of which are assigned to the same assignee as the present invention.

The metallic halides which can be employed in the practice of the present invention include both the platinous and platinic halides; and the dihalides; trihalides and tetrahalides of molybdenum, bismuth, and tellurium. Among such halides may be mentioned, for instance, platinic chloride, platinous chloride, platinic bromide, platinous bromide, platinic fluoride, platinic iodide, hydrates of such platinum halides, for instance, a hydrate of platinic chloride ($PtCl_4 \cdot 8H_2O$), etc.; bismuth tribromide, bismuth trichloride, bismuth dichloride, bismuth fluoride, bismuth iodide, etc.; molybdenum dibromide, molybdenum dichloride, molybdenum trichloride, molybdenum tetrachloride, molybdenum pentachloride, the various molybdenum oxychlorides (e.g. $MoOCl_3$), molybdenum hexafluoride, etc.; tellurium dibromide, tellurium dichloride, tellurium tetrachloride, tellurium tetraiodide, etc.

The amount of metallic halide (which term is intended to cover the above class of platinum, bismuth, tellurium and molybdenum halides) which may be employed in the practice of this invention can be varied widely. Amounts as small as 0.1% of the metal halide, based on the weight of the resin, can cause an increase in the fusion temperature and reduce the solubility of the vinyl halide resin in solvents in which the normally thermoplastic vinyl halide resin is soluble. Advantageously, I employ a minor proportion of the metal halide and preferably from about 0.1 to about 10% or more, by weight, of the metal halide, based on the weight of the vinyl halide resin. The exact amount of the metal halide used will depend upon such factors as the application involved (electrical applications usually requiring smaller amounts of the metal halide), the amount and type of other ingredients used with the vinyl halide resins, such as plasticizers, heat and light stabilizers, pigments, fillers, etc.

Generally, in order to carry out the invention, it is only necessary to mix the plasticizer with the metallic halide, and this mixture is then dry blended with the vinyl chloride resin, which is then subjected to milling at temperatures of from 110–130° C. (preferably at about 125° C.), incorporating at the same time any other modifying agents such as those mentioned above, and thereafter heating the mixture of ingredients at temperatures in excess of 75° C. and advantageously at temperatures ranging from about 130–170° C. for times ranging from 5 to 60 minutes or more, if desired, at pressures of from 100–1000 p.s.i.

Among the plasticizers which may be incorporated in the vinyl halide resin, may be mentioned for instance dioctyl phthalate, dibenzyl sebacate, tricresyl phosphate, dibutyl phthalate, di-(2-ethylhexyl) phthalate, di(2-ethylhexyl) tetrachlorophthalate, etc. The amount of plasticizer used may vary, on a weight basis, of from about 0.1 to 2 parts of the plasticizer per part of the vinyl halide resin. Thus, the amount of the plasticizer employed may vary from about 20% to 80%, by weight, based on the total weight of the vinyl halide resin and the plasticizer.

Among the stabilizers which may be employed in the practice of the present invention may be mentioned, for instance, PbO, $Pb_2O_3$, $Pb_3O_4$, other lead compounds including those disclosed and claimed in Safford Patent 2,269,990 issued January 13, 1942, as well as the lead salt stabilizers disclosed in Safford Patent 2,455,879 issued December 7, 1948.

Among the fillers which may be employed are, for instance, carbon black, silica, barytes, zinc oxide, clay, wood flour, and other pigments or fillers commonly used in the rubber and plastic industries. The amount of fillers can be varied widely and generally is within the range of from about 5 to 200%, by weight, of the total weight of the filler, plasticizer, and vinyl halide resin. Generally, on a weight basis, the filler is advantageously employed from about 0.1 to 2 parts of the latter per part of the vinyl halide resin.

In order that those skilled in the art may better understand how the present invention may be practiced, the following examples are given by way of illustration and not by way of limitation. All parts are by weight. In all the examples, the vinyl chloride resin used was solid gamma-polyvinyl chloride.

EXAMPLE 1

A homogeneous mixture was obtained on milling 58 parts polyvinyl chloride resin (obtained by polymerizing vinyl chloride in the usual fashion) and 40 parts of either di-(2-ethylhexyl) phthalate (identified hereinafter as "phthalate") or tricresyl phosphate. Samples of either formulations were made up in which 2 parts of either platinic chloride ($PtCl_4$) or platinous chloride ($PtCl_2$) was incorporated in each of the aforesaid formulations in the manner described above. As a control, mixtures of the polyvinyl chloride and di-(2-ethylhexyl) phthalate or tricresyl phosphate without any platinum halide were also prepared. Each of the samples both with and without the metal halides was pressed at a temperature of 150° C. at a pressure of about 500 p.s.i. for 30 minutes into the form of sheets, and these sheets were then tested for physical properties at room temperature (30° C.) and at elevated temperatures (150° C.). Table 1 below shows the properties of the molded samples at the aforesaid test temperatures.

Table 1

| | Test 30° C. | | Test 150° C. | |
|---|---|---|---|---|
| | Tensile, p.s.i. | Elongation, Percent | Tensile, p.s.i. | Elongation, Percent |
| Control (tricresyl phosphate) | 3,087 | 289 | 52.8 | 121 |
| Control (phthalate) | 2,423 | 319 | 38.2 | 141 |
| $PtCl_4$ (phthalate) | 3,150 | 170 | 175 | 116 |
| $PtCl_4$ (tricresyl phosphate) | 3,713 | 124 | 366 | 109 |
| $PtCl_2$ (tricresyl phosphate) | | | 194 | 96 |

Each of the samples containing the platinum chloride was infusible and insoluble in common solvents such as benzene.

EXAMPLE 2

In this example, a plasticized gamma-polyvinyl chloride resin was prepared by mixing together 58 parts polyvinyl chloride and 40 parts of either tricresyl phosphate or di-(2-ethylhexyl) phthalate. Again, to samples of each of the above formulations were added 2 parts of bismuth chloride ($BiCl_3$), or tellurium chloride ($TeCl_4$ and $TeCl_2$), or molybdenum chloride ($MoCl_5$). Each of the samples was then heated and pressed similarly as was done in Example 1, and the sheets thereby obtained were tested for their physical properties at 150° C. to give the results found in Table 2 below:

Table 2

| Curing Agent | Plasticizer Tricresyl Phosphate | |
|---|---|---|
| | Tensile, p.s.i. | Percent Elongation |
| $BiCl_3$ | 283 | 230 |
| $TeCl_4$ | 243 | 178 |
| $MoCl_5$ | 241 | 138 |
| $TeCl_2$ | 188 | 185 |

| | Plasticizer Di-(2-ethylhexyl) phthalate | |
|---|---|---|
| $BiCl_3$ | 273 | 178 |
| $TeCl_4$ | 132 | 122 |
| $MoCl_5$ | 167 | 76 |
| $TeCl_2$ | 136 | 135 |

EXAMPLE 3

The unpredictability of being able to effect cross-linking of vinyl halide resins by means of the metal halides described above is illustrated by the fact that when one employed other metallic halides which might be expected to be equally as effective, for instance, aluminum trichloride or boron trifluoride, in place of the other metal halides, the results were as shown in Table 3 below:

*Table 3*

|  | Test 30° C. | | Test 150° C. | |
|---|---|---|---|---|
|  | Tensile, p.s.i. | Elongation, Percent | Tensile, p.s.i. | Elongation, Percent |
| 2% AlCl₃ in Composition of Example 1 plasticized with tricresyl phosphate | 2,977 | 200 | 48.9 | 118 |
| 2% AlCl₃ in Composition of Example 1 plasticized with phthalate | 2,597 | 220 | 57.3 | 120 |
| 2% BF₃ in Composition of Example 1 plasticized with tricresyl phosphate | 3,217 | 235 | 88.1 | 129 |
| 2% BF₃ in Composition of Example 1 plasticized with phthalate | 2,883 | 277 | 69.1 | 152 |

EXAMPLE 4

This example illustrates the ability to cure an unplasticized vinyl halide resin with the metal halides employed in the present invention. More particularly, polyvinyl chloride resin (because of its hardness and difficulty to mill in the unplasticized state) was dissolved in boiling methyl ethyl ketone and while in this state 2%, by weight, platinic chloride based on the total weight of the latter and the polyvinyl chloride, was added to the solution. After effecting intimate mixing of the ingredients, the solution was then heated at a temperature of 60–70° C. in a "Rinco evaporator" until essentially all the methyl ethyl ketone had been removed. Samples of the polyvinyl chloride with 5% PBO (as a stabilizer) either alone or in combination with platinic chloride were also prepared in the same manner as above. Thereafter, samples of each of the compositions thus prepared were pressed in a mold at 150° C. for varying lengths of time at a pressure of about 500 p.s.i. The tensile strengths and percents elongation at 150° C. were then determined for each of the samples. The following Table 4 shows the times of heating in the mold for the various samples at 150° C., as well as the tensile strengths and percents elongation found at the elevated temperatures.

*Table 4*

|  | Time of Heating, min. | Tensile, p.s.i. | Elongation, Percent |
|---|---|---|---|
| 100% PVC ¹ | 10 | 90 | 150 |
| 98% PVC+2% PtCl₄ | 10 | 413 | 220 |
| 95% PVC+5% PbO | 20 | 161 | 100 |
| 93% PVC+2% PtCl₄+5% PbO | 20 | 443 | 113 |

¹ Abbreviation for polyvinyl chloride.

It will of course be apparent to those skilled in the art, that instead of employing the metal halides used in the foregoing examples, other metallic halides of the same class, many examples of which have been given previously may be used without departing from the scope of the invention. The vinyl halide resin can also be varied widely, and no intent should be read into the above description to the vinyl halide resin which can be used. Finally, the proportions of ingredients used as well as the other modifying ingredients and the conditions under which the curing is carried out, may be varied within wide limits, as is clearly pointed out above.

The compositions of the present invention, particularly the compositions rendered substantially infusible and insoluble, can be obtained by various means including extrusion, injection molding, flame spraying, plasma spraying, plastisol techniques (e.g., by dripping or slush molding), compression molding, etc. These compositions can be used as insulation for electrical conductors and can also be used in the preparation of tapes, varnishes (wherein the potentially infusible and insoluble composition with the metal halide is dissolved in a suitable solvent and after application to the desired surface, is heated at elevated temperatures to effect the conversion to the infusible, insoluble state), as adhesives, as castings, laminated products, etc. The compositions herein described and claimed can be used for encapsulating electrical components which will be required to have resistance to elevated temperatures and to solvents.

What I claim as new and desire to secure by Letters Patent of the United States is:

1. A heat-cured composition containing as essential ingredients (1) polyvinyl chloride resin, (2) a plasticizer for (1) in which the plasticizer is present, on a weight basis, of from 0.1 to 2 parts of the plasticizer per part of the vinyl chloride resin, and (3) from 0.1 to 10%, by weight, based on the weight of (1) of a metal halide selected from the class consisting of bismuth halides, molybdenum halides, tellurium halides, and platinum halides.

2. A heat-cured composition of matter containing as essential ingredients (1) polyvinyl chloride, (2) a plasticizer for (1) which is present, on a weight basis, of from 0.1 to 2 parts of the plasticizer per part of the polyvinyl chloride, and (3) from 0.1 to 10%, by weight, based on the weight of (1) of a bismuth halide.

3. A heat-cured composition of matter containing as essential ingredients (1) polyvinyl chloride, (2) a plasticizer for (1) which is present, on a weight basis, of from 0.1 to 2 parts of the plasticizer per part of the polyvinyl chloride, and (3) from 0.1 to 10%, by weight, based on the weight of (1) of a platinum halide.

4. A heat-cured composition of matter containing as essential ingredients (1) polyvinyl chloride, (2) a plasticizer for (1) which is present, on a weight basis, of from 0.1 to 2 parts of the plasticizer per part of the polyvinyl chloride, and (3) from 0.1 to 10%, by weight, based on the weight of (1) of a molybdenum halide.

5. A heat-cured composition of matter containing as essential ingredients (1) polyvinyl chloride, (2) a plasticizer for (1) which is present, on a weight basis, of from 0.1 to 2 parts of the plasticizer per part of the polyvinyl chloride, and (3) from 0.1 to 10%, by weight, based on the weight of (1) of a tellurium halide.

6. A heat-cured composition of matter containing as essential ingredients (1) polyvinyl chloride, (2) a plasticizer for (1) comprising tricresyl phosphate which is present, on a weight basis, of from 0.1 to 2 parts of the latter per part of polyvinyl chloride, and (3) from 0.1 to 10%, by weight, based on the weight of (1) of platinic chloride.

7. A heat-cured composition of matter containing as essential ingredients (1) polyvinyl chloride, (2) a plasticizer for (1) comprising tricresyl phosphate which is present on a weight basis, of from 0.1 to 2 parts of the latter per part of polyvinyl chloride, and (3) from 0.1 to 10%, by weight, based on the weight of (1) of bismuth chloride.

8. A heat-cured composition of matter containing as essential ingredients (1) polyvinyl chloride, (2) a plasticizer for (1) comprising tricresyl phosphate which is present, on a weight basis, of from 0.1 to 2 parts of the latter part of polyvinyl chloride, and (3) from 0.1 to 10%, by weight, based on the weight of (1) of molybdenum chloride.

9. A heat-cured composition of matter containing as essential ingredients (1) polyvinyl chloride, (2) a plasticizer for (1) comprising tricresyl phosphate which is present, on a weight basis, of from 0.1 to 2 parts of the latter per part of polyvinyl choride, and (3) from 0.1 to 10%, by weight, based on the weight of (1) of tellurium chloride.

10. A heat-cured composition of matter containing as essential ingredients (1) polyvinyl chloride, (2) a plasticizer for (1) comprising di-(2-ethylhexyl) phthalate which is present, on a weight basis, of from 0.1 to 2 parts of the latter per part of the polyvinyl chloride, and (3) from 0.1 to 10%, by weight, based on the weight of (1) of bismuth chloride.

11. A heat-cured composition of matter containing as essential ingredients (1) polyvinyl chloride, (2) a plasticizer for (1) comprising di-(2-ethylhexyl) phthalate which is present, on a weight basis, of from 0.1 to 2 parts of the latter per part of the polyvinyl chloride, and (3) from 0.1 to 10%, by weight, based on the weight of (1) of molybdenum chloride.

References Cited by the Examiner
UNITED STATES PATENTS

| | | | |
|---|---|---|---|
| 2,157,997 | 5/39 | Brous | 260—92.8 |
| 2,921,032 | 1/60 | Linn | 23—87 |
| 3,091,597 | 5/63 | Henriques | 260—41 |

MORRIS LIEBMAN, *Primary Examiner.*